United States Patent [19]

Brewbaker et al.

[11] 4,204,048
[45] May 20, 1980

[54] HALOPOLYMERS CROSSLINKED WITH A 1,3-DIAMINOPROPANE

[75] Inventors: James L. Brewbaker; Rodrique L. Marzett, both of Midland, Mich.

[73] Assignee: The Dow Chemical Company, Midland, Mich.

[21] Appl. No.: 945,944

[22] Filed: Sep. 26, 1978

[51] Int. Cl.$^2$ .............................................. C08F 8/32
[52] U.S. Cl. ...................................... 525/343; 525/382
[58] Field of Search ............................... 526/52.5, 33

[56] References Cited

U.S. PATENT DOCUMENTS

| 2,811,501 | 10/1957 | Stedvy | 526/52.5 |
|---|---|---|---|
| 2,951,832 | 9/1960 | Moran | 526/52.5 |
| 3,071,565 | 1/1963 | Davis et al. | 526/52.5 |
| 3,080,336 | 3/1963 | Smith | 526/52.5 |
| 3,080,347 | 3/1963 | Sandberg et al. | 526/52.5 |
| 3,090,775 | 5/1963 | Smith | 526/52.5 |
| 3,345,315 | 10/1967 | Barton et al. | |
| 3,485,788 | 12/1969 | Csaszav | |
| 3,594,449 | 7/1971 | Binder | |
| 4,032,700 | 6/1977 | Song et al. | 526/52.5 |

FOREIGN PATENT DOCUMENTS

| 547732 | 9/1942 | United Kingdom | 526/52.5 |
|---|---|---|---|
| 814560 | 6/1959 | United Kingdom | |
| 867209 | 5/1961 | United Kingdom | |
| 1073504 | 6/1967 | United Kingdom | |
| 1357008 | 6/1974 | United Kingdom | |

OTHER PUBLICATIONS

Kauch. Rezina 35, 30, Lontsov et al., 1976.

Primary Examiner—William F. Hamrock
Attorney, Agent, or Firm—T. R. Wills

[57] ABSTRACT

Halopolymers, such as chlorinated polyethylene, are uniquely vulcanized by heating a curable mixture including the halopolymer and a 1,3-diaminopropane or salt thereof. A preferred mixture further includes an acid acceptor, such as calcium oxide or calcium hydroxide, and sulfur or a sulfur-containing compound.

17 Claims, No Drawings

HALOPOLYMERS CROSSLINKED WITH A 1,3-DIAMINOPROPANE

BACKGROUND OF THE INVENTION

The present invention relates to heat-curable, elastomer-forming halopolymer compositions and to cured elastomers prepared therefrom.

Several methods are known which enable halopolymers, such as halogenated polyolefins, to be vulcanized, cured, or crosslinked to form useful elastomeric products. For example, crosslinking has been effected by reacting the halopolymer with organic peroxides, polyfunctional amines, aliphatic polyazo compounds, or a combination of sulfur, a Group II metal oxide, and rubber vulcanization accelerator. Among these, the reaction with an organic peroxide has attained a prominent position in commercial applications due to the high degree of cure achieved thereby.

Nevertheless, the peroxide vulcanization of halogenated polyolefins, in particular, suffers from a number of significant problems, not the least of which are the high cost of the peroxide curing agents themselves and the high cost of the ester plasticizers which are typically used in such formulations. As a result, fully formulated chlorinated polyethylene, for example, has not been able to economically compete with other synthetic rubbers in its class, such as fully formulated polychloroprene.

Accordingly, workers in the art have embarked upon the search for an effective curing system for halopolymers, especially the halogenated polyolefins, which would not require the use of organic peroxides. An example of such a system has been described by A. A. Lontsov et al. in *Kauch. Rezina* 35, 30 (1976), wherein a combination of hexamethylenediammonium sebacate, sulfur, and magnesium oxide was reported to successfully crosslink chlorinated polyethylene.

It is a general object of the present invention to provide a non-peroxide curing system for halopolymers. More particularly, it is an object to provide an improved non-peroxide curing system for halogenated polyolefins which is superior to that described by Lontsov et al.

SUMMARY OF THE INVENTION

In one embodiment, the present invention provides a heat-curable, elastomer-forming composition comprising a halopolymer and about 1 to about 15 parts of a 1,3-diaminopropane or salt thereof per hundred parts by weight of the halopolymer.

In another embodiment, the present invention provides an improvement in a method of heat-curing halopolymers with an aliphatic polyamine vulcanizing agent, wherein the improved method is characterized by employing a 1,3-diaminopropane or salt thereof as the aliphatic polyamine.

DETAILED DESCRIPTION OF THE INVENTION

Halopolymers which can be used in the practice of this invention are any of those which are known in the art to form elastomers by heat-curing with an aliphatic polyamine vulcanizing agent. Such halopolymers include the homopolymers and copolymers of halogen-containing monomers, such as 2-chloro-1,3-butadiene (the polymers of which are commonly known as polychloroprene), as well as the polymers obtained by post-halogenation in solution, in the molten state, or in aqueous suspension according to processes well known in the art. Exemplary halogenating agents which can be employed in such post-halogenation processes include molecular halogens such as chlorine or bromine, interhalogens such as bromochlorine, and sulfuryl halides such as sulfuryl chloride. Preferred halopolymers include the post-halogenated homopolymers, copolymers, and interpolymers of olefinic monomers such as ethylene, propylene, n-butylene, isobutylene, and the like. It will be appreciated that the degree of crystallinity and halogen content of such halopolymers can be varied to obtain a cured, elastomeric product having the properties desired by a user. It is noted, however, that the degree of crosslinking which can be obtained in the cured product will be moderately increased as the halogen content of the starting halopolymer is increased. With respect to chlorinated polyethylene, it appears to be advantageous to have a chlorine content greater than about 25 percent in order to obtain an acceptable degree of crosslinking.

As used herein, the term "1,3-diaminopropane" is intended to include the unsubstituted compound corresponding thereto as well as those wherein either the carbon or nitrogen moieties are singly or multiply substituted with alkyl, alkenyl, cycloalkyl, or aryl groups. It has been found that the effectiveness of alkyl-substituted 1,3-diaminopropanes decreases with increasing substitution of the nitrogen moieties, i.e., the order of effectiveness of the substituted 1,3-diaminopropanes with respect to N,N'-substitution can be generalized as follows:

$$1°,1° > 1°,2° > 2°,2° > 1°,3° > 2°,3° > 3°,3°$$

In addition, it has been found that substituted 1,3-diaminopropanes are more effective than the unsubstituted compound and that, with respect to alkyl substitution, the effectiveness of a substituted 1,3-diaminopropane increases with increasing alkyl chain length. Consequently, the preferred 1,3-diaminopropanes will be selected accordingly.

With respect to the salts of 1,3-diaminopropanes, it appears that the anion component thereof is not critical and that, when used in conjunction with an acid acceptor, the 1,3-diaminopropanes and salts thereof are substantially equivalent in their effectiveness. Exemplary anions which may be used include carboxylate and dicarboxylate anions such as those derived from acetic acid, oxalic acid, succinic acid, benzoic acid, and the like; halides such as those derived from hydrogen chloride, hydrogen bromide, hydrogen iodide, and the like; and sulfate.

The amount of a 1,3-diaminopropane or salt thereof which is employed will generally range from about 1 to about 15 parts, preferably from about 1 to about 10 parts, per hundred parts halopolymer (hereinafter abbreviated as "phr"). The actual amount needed to effect the desired level of cure will depend upon the particular 1,3-diaminopropane or salt thereof used as well as the relative proportions and strengths of the vulcanizing coagents used, if any (as hereinafter described). Generally, it has been found that an increase in the amount of 1,3-diaminopropane or salt thereof will result in an increase in the extent of cure, a decrease in cure time, and a decrease in scorch time.

It has been found that certain acid acceptors are advantageously employed in combination with a 1,3-diaminopropane or salt thereof to further enhance the curing of a halopolymer. Exemplary acid acceptors which may be used include the oxides, hydroxides, sulfides, carbonates, and phosphates of the alkali metals and alkaline earth metals. Of these calcium hydroxide, calcium oxide, magnesium oxide, and tribasic potassium phosphate are preferred, especially calcium oxide and calcium hydroxide. Powdered molecular sieve has also been found to be effective. However, basic lead carbonate, zinc oxide, and tetraoctadecyl titanate have been found to have a deleterious effect on the curing properties of 1,3-diaminopropanes and salts thereof. Accordingly, the term "acid acceptor" as used herein is intended to include those compounds within that class which enhance the curing of halopoplymers when using the 1,3-diaminopropane vulcanizing agents of the present invention. Guided by the exemplary listed compounds, and with only minor experimentation, a user will be able to readily choose an acid acceptor suitable for use in the present curing system. Generally, the acid acceptor may be employed in amounts ranging from about 1 to about 50 phr, but it is preferably used in amounts of about 1 to about 20 phr. It has been observed that an increase in the amount of acid acceptor will result in an increase in the extent of cure, but also in a decrease in the scorch time. Hence, these effects must be taken into consideration when choosing the amount of acid acceptor to be used.

The curing of a halopolymer with a 1,3-diaminopropane or salt thereof is also advantageously enhanced by employing in combination therewith sulfur or a sulfur-containing compound such as sodium thiosulfate, sodium hydrosulfide, tetramethylthiuram disulfide, and dipentamethylene thiuram hexasulfide. Due to its ready availability and low cost, elemental sulfur is preferred. In a fashion similar to the effect of the acid acceptor, an increase in the amount of sulfur or sulfur-containing compound will increase the extent of cure and decrease the scorch time. Only a minor amount of sulfur or sulfur-containing compound is required to effect an enhanced cure. When elemental sulfur is used, for example, the amount may range from about 0.1 to about 10 phr; preferably, from about 0.1 to 3 phr. Advantageously, however, the actual amount of sulfur or sulfur-containing compound employed should be adjusted relative to the amount of 1,3-diaminopropane or salt thereof employed in order to keep total cure time low. Preliminary studies have shown that a ratio of about 1 part elemental sulfur to about 2.5 parts 1,3-diaminopropane or salt thereof will give an acceptable balance between extend of cure and total cure time.

A minor amount of iodide or bromide ions in combination with the other vulcanization agents will beneficially affect the results of the present curing system. Iodide ions are preferred and should be employed in an amount such that the molar ratio of iodide ions to 1,3-diaminopropane or salt thereof is less than about 1:1, whereby both the extent of cure and, surprisingly, scorch time will be increased; larger amounts will decrease the extent of cure. The preferred molar ratio ranges from about 0.2:1 to 0.4:1. It would appear that any suitable source of iodide ions may be used in the present system. Suitable sources include sodium iodide, the alkyl iodides, and like compounds. If desired, the iodide ion can be provided by replacing a portion of the 1,3-diaminopropane or salt thereof to be used with a 1,3-diaminopropane salt having iodide as the anion component.

In accordance with typical procedures used in the vulcanization art, the heat-curable compositions of the present invention will generally contain other conventional compounding ingredients such as reinforcing agents and fillers, antioxidants, plasticizers, and the like. It is noteworthy that the present 1,3-diaminopropane curing system will permit the use of inexpensive hydrocarbon extending oils as well as the ester plasticizers commonly used with conventional peroxide-cure halogenated polyolefin formulations. Advantageously, the heat-curable compositions of the present invention will further contain a minor amount of a synergistic mixture of N-(cyclohexylthio)phthalimide and N-nitrosodiphenylamine to extend shelf life and improve scorch time.

A heat-curable composition in accordance with the present invention is prepared by admixing a halopolymer, a 1,3-diaminopropane or salt thereof, and other additives, as desired, by blending on a two-roll mill or in a Banbury mixer or other suitable apparatus until homogeneity of the formulation is achieved. In some instances, i.e., when the diamine or diamine salt is in the form of a greasy paste, it may be desirable to first heat the diamine or diamine salt and blend the resulting liquid with an inert solid, such as fumed silica. The so-formed blend can then be cooled, crushed, and added to the heat-curable composition in the form of a free-flowing powder, thus facilitating rapid mixing therewith. During preparation, care should be taken to maintain the heat-curable composition as cool as possible to avoid excessive heat buildup and premature curing. Compounding temperatures are preferably regulated in the range of about 20° to 120° C. The resulting composition can be shaped by extrusion or other conventional means and cured by heating to a temperature in the range of about 90° to 220° C. The time necessary to effect cure will depend upon the particular composition used and upon the temperature to which it is heated. Usually, such times will range from about 2 minutes to 5 hours. Generally, the temperatures and time periods suitable for cure correspond to those commonly used in the rubber fabrication industry.

The following examples illustrate the invention but are not to be taken as limiting its scope. Parts and percentages are by weight unless otherwise indicated or required by context.

In the examples, heat-curable compositions were compounded on a two-roll mill, operated with slight cooling on one roll. The stock was sheeted off the mill and cut into about 1 inch$^2$ pieces. Unless otherwise indicated, the compositions were tested for cure properties by placing a stack of these pieces (about 9 grams) in a Monsanto R-100 oscillating disk rheometer operating at a temperature of 320° F. and a frequency of 1.7 Hz, with the degree of rotation set at 3°. Three parameters were used to judge the effectiveness of a curing system: (a) scorch time—the time, in minutes, from the start of a curing test to the point at which the torque curve rises 2 inch-pounds above the minimum torque value; (b) extent of cure ($\Delta T_{min\text{-}30}$)—the difference, in inch-pounds, between minimum torque value and torque value 30 minutes after the start of a curing test; (c) completeness of cure ($\Delta T_{25\text{-}30}$)—the torque value change, in inch-pounds, observed within the interval of 25 to 30 minutes after the start of a curing test.

EXAMPLE 1

In accordance with the present invention, chlorinated polyethylene (CPE), obtained from The Dow Chemical Company as CM 0136, was compounded with a diamine diacetate having the formula $C_{18}H_{37}N^{\oplus}H_2(CH_2)_xN^{\oplus}H_3 \cdot 2CH_3CO_2^{\ominus}$, wherein X=3, and various other ingredients in the following proportions:

| Ingredient | Parts |
| --- | --- |
| CPE | 100 |
| STERLING SO carbon black | 40 |
| SUNDEX 790 extending oil | 15 |
| CaO | 10 |
| $S_8$ | 1.6 |
| NaI | 0.5 |
| diamine diacetate | (0.0167 amine equivalent/100g CPE) |

The resulting heat-curable composition (identified as Sample 1A) was then cured as earlier described.

For comparison, similar heat-curable compositions were prepared with various homologues of the diamine diacetate, i.e., wherein X=2, 4, 5, and 6 (identified, respectively, as Samples 1B, 1C, 1D, and 1E), and tested under identical conditions.

The results of these tests as shown in Table I, demonstrate the surprising and unique curing properties of the diamine diacetate corresponding to 1,3-diaminopropane as compared to the homologues thereof. Similar beneficial and unique results will be observed with any 1,3-diaminopropane or salt thereof in accordance with the present invention.

TABLE I

| Sample | x | Scorch (min) | $\Delta T_{25-30}$ (in-lb) | $\Delta T_{min-30}$ (in-lb) |
| --- | --- | --- | --- | --- |
| The invention | | | | |
| 1A | 3 | 2.1 | 1.7 | 59.1 |
| For Comparison | | | | |
| 1B | 2 | 3.3 | 3.0 | 36.6 |
| 1C | 4 | 3.6 | 3.0 | 29.8 |
| 1D | 5 | 5.2 | 3.2 | 32.2 |
| 1E | 6 | 4.9 | 3.5 | 30.6 |

EXAMPLE 2

In accordance with the present invention, various diamine diacetates having the general formula $RN^{\oplus}H_2(CH_2)_3N^{\oplus}H_3 \cdot 2CH_3CO_2^{\ominus}$ were tested using the recipe of Example 1.

The results of these tests, as shown in Table II, demonstrate that the effectiveness of N-alkyl-1,3-diaminopropanes increases with increasing length of the alkyl chain. Based on this data, the preferred alkyl chain will have from about 4 to 20 carbon atoms.

TABLE II

| Sample | R | $\Delta T_{min-30}$ (in-lb) |
| --- | --- | --- |
| 2A | H | 21.8 |
| 2B | $C_4H_9$ | 41.0 |
| 2C | $C_6H_{13}$ | (47)* |
| 2D | $C_8H_{17}$ | 51.8 |
| 2E | $C_{12}H_{25}$ | 55.4 |
| 2F | $C_{16}H_{33}$ | 56.0 |
| 2G | $C_{18}H_{37}$ | 59.1 |

*estimated

EXAMPLE 3

In accordance with the present invention, various substituted diamine diacetates were tested using the recipe of Example 1.

The results of these tests, as shown in Table 3, demonstrate that the effectiveness of alkyl-substituted 1,3-diaminopropanes decreases with increasing substitution of the nitrogen moieties.

TABLE III

| Sample | Structure of Parent Diamine | Scorch (min) | $\Delta T_{25-30}$ (in-lb) | $\Delta T_{min-30}$ (in-lb) |
| --- | --- | --- | --- | --- |
| 3A | 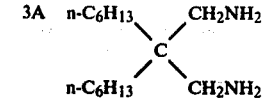 | 2.8 | 3.9 | 62.6 |
| 3B | $(n\text{-}C_{12}H_{25})NH(CH_2)_3NH_2$ | 2.1 | 1.7 | 55.4 |
| 3C | $(n\text{-}C_6H_{13})NH(CH_2)_3NH_2$ | — | — | (47)* |
| 3D | $(n\text{-}C_6H_{13})NH(CH_2)_3NH(n\text{-}C_6H_{13})$ | 2.1 | 1.1 | 43.8 |
| 3E | $(n\text{-}C_6H_{13})_2N(CH_2)_3NH_2$ | 4.0 | 3.2 | 37.0 |
| 3F | $(n\text{-}C_4H_9)_2N(CH_2)_3N(n\text{-}C_4H_9)_2$ | 7.8 | 3.3 | 20.8 |

*estimated from TABLE II

EXAMPLE 4

Various heat-curable compositions were prepared from the following ingredients (in parts by weight):

| | Sample | | | |
| --- | --- | --- | --- | --- |
| Ingredient | 4A | 4B | 4C | 4D[(1)] |
| CPE CM 0136 | 100 | 100 | 100 | 100 |
| STERLING SO carbon black | 40 | 40 | 40 | 40 |
| SUNDEX 790 extending oil | 15 | 15 | 15 | 15 |
| NaI | 0.5 | 0.5 | 0.5 | 0.5 |
| $S_8$ | 2 | 2 | — | 2 |
| MgO | 10 | — | 10 | 10 |
| diamine diacetate[(2)] | 7.5 | 7.5 | 7.5 | — |

Notes:
[(1)]Not within the scope of the present invention.
[(2)]A diacetate salt of N-aliphatic-1,3-diaminopropane, wherein the aliphatic group is derived from tallow and is principally a mixture of saturated and unsaturated $C_{16}$ and $C_{18}$ radicals, obtained from Armak Company as DUOMAC T.

The compositions were then cured and tested according to the procedures described earlier. The results of these tests, as shown in Table IV, demonstrate the synergistic effect on the extent of cure brought about by a combination of sulfur, an acid acceptor, and a 1,3-diaminopropane or salt thereof.

TABLE IV

| Sample | $\Delta T_{min-30}$ (in-lb) |
| --- | --- |
| The Invention | |
| 4A | 61.5 |
| 4B | 16.0 |
| 4C | 7.0 |
| For Comparison | |
| 4D | 0.8 |

EXAMPLE 5

Various heat-curable compositions were prepared with different acid acceptors according to the following recipe:

| Ingredient | Parts |
| --- | --- |
| CPE CM 0136 | 100 |
| STERLING SO carbon black | 40 |
| SUNDEX 790 extending oil | 15 |
| acid acceptor | 10 |
| DUOMAC T diamine diacetate | 3.8 |
| $S_8$ | 2 |
| NaI | 0.5 |

The results of these tests, as shown in Table V, demonstrate the variation in effectiveness of different acid acceptors. Only those acid acceptors which increase the extent of cure, as compared to heat-curable compositions not containing an acid acceptor, are suitable for use in the present invention.

TABLE V

| Sample | Acid Acceptor | $\Delta T_{min-30}$ (in-lb) |
| --- | --- | --- |
| Control | None | 16.0 |
| For Comparison | | |
| 5A | $2PbCO_3 \cdot Pb(OH)_2$ | 2.4 |
| 5B | $Ti(OC_{18}H_{37})_4$ | 9.5 |
| The Invention | | |
| 5C | $CaCO_3$ | 18.0 |
| 5D | Powdered 13X Molecular Sieve | 21.1 |
| 5E | $Mg(OH)_2$ | 21.3 |
| 5F | BaS | 24.0 |
| 5G | CaS | 26.2 |
| 5H | NaOH | 32.6 |
| 5I | $Ba(OH)_2$ | 32.8 |
| 5J | BaO | 39.2 |
| 5K | $K_3PO_4 \cdot H_2O$ | 49.0 |
| 5L | MgO | 50.0 |
| 5M | CaO | 62.8 |
| 5N | $Ca(OH)_2$ | 65.1 |

EXAMPLE 6

Various heat-curable compositions were prepared with different halopolymers according to the following recipes:

| RECIPE #1 | |
| --- | --- |
| Ingredient | Parts |
| halopolymer | 100 |
| SANTICER 711 plasticizer | 15 |
| CaO | 10 |
| DUOMAC T diamine diacetate | 4.0 |
| $S_8$ | 1.6 |
| NaI | 0.5 |

| RECIPE #2 | |
| --- | --- |
| Ingredient | Parts |
| halopolymer | 100 |
| CaO | 10 |
| DUOMAC T diamine diacetate | 2 |
| $S_8$ | 0.8 |
| NaI | 0.5 |

The results of these tests, as shown in Table VI, demonstrate that a 1,3-diaminopropane or salt thereof can be used to vulcanize a wide variety of heat-curable halopolymers. With respect to CPE, it appears to be advantageous to have a chlorine content greater than about 25% in order to obtain an acceptable cure level. In addition, it is noted that the CPE sample which had been minimally brominated showed enhanced cure as compared to the nonbrominated sample.

TABLE VI

| Sample | Recipe # | Halopolymer | $\Delta T_{min-30}$ (in-lb) |
| --- | --- | --- | --- |
| 6A | 1 | CPE:46% chlorine | 44.5 |
| 6B | 1 | CPE:36% chlorine (CM 0136) | 42.5 |
| 6C | 1 | CPE:25% chlorine | 9.8 |
| 6D | 1 | HYPALON 40 chlorosulfonated polyethylene | 75.0 |
| 6E | 1 | NEOPRENE NE-W polychloroprene | 35.5 |
| 6F | 2 | CPE:36% chlorine (CM 0136) | 38.0 |
| 6G | 2 | BRCPE:34% chlorine + 2.2% bromine (solution brominated CM 0136) | 55.0 |

EXAMPLE 7

Various heat-curable compositions were prepared from the following ingredients (in parts by weight):

| | Sample | | | |
| --- | --- | --- | --- | --- |
| Ingredient | 7A | 7B | 7C | 7D |
| CPE CM 0136 | 100 | 100 | 100 | 100 |
| SUNDEX 790 extending oil | 30 | 30 | 30 | 30 |
| N774 carbon black | 60 | 60 | 60 | 60 |
| MgO | 5 | 5 | 5 | 5 |
| $S_8$ | 2 | 2 | 2 | 2 |
| DUOMAC T diamine diacetate | 7 | 7 | 7 | 7 |
| SANTOGARD PVI N-(cyclohexylthio)phthalimide | — | 1 | — | 1 |
| REDAX N-nitrosodiphenylamine | — | — | 2 | 2 |

The resulting compositions were cured and tested on a Mooney viscometer. The results of these tests, as shown in Table VII, demonstrate that N-(cyclohexylthio)phthalimide effectively extends the shelf life of the heat-curable compositions of the present invention. The results further demonstrate that while neither N-(cyclohexylthio)phthalimide nor N-nitrosodiphenylamine significantly enhanced scorch time, a synergistic combination of the two did.

TABLE VII

| | Sample | | | |
| --- | --- | --- | --- | --- |
| | 7A | 7B | 7C | 7D |
| Original Physical Properties Cured 30 Minutes @ 320° F.: | | | | |
| 100% Modulus, psi | 447 | 419 | 427 | 333 |
| 200% Modulus, psi | 1080 | 930 | 947 | 722 |
| Ultimate Tensile, psi | 1953 | 1860 | 1813 | 1778 |
| Elongation, % | 470 | 520 | 470 | 600 |
| Hardness, Shore A | 69 | 69 | 67 | 66 |
| Original Processing Properties | | | | |
| Mooney Viscosity (MS1 Minimum) 250° F. | 30 | 27 | 21 | 25 |
| Mooney Scorch Ms1 (Δ5) 250° F., Minutes | 4 | 6.5 | 7 | 26 |
| Processing Properties After Aging @ Room Temperature for 28 Days | | | | |
| Mooney Viscosity (Ms1 Minimum) 250° F. | 47 | 29 | 32* | 26 |
| Mooney Scorch Ms1 (Δ5) 250° F., Minutes | 3 | 7 | 8* | 40 |

*Processing Properties After Aging @ Room Temperature for 7 Days

What is claimed is:

1. A heat-curable, elastomer-forming composition comprising (a) a chlorine- or bromine-containing halopolymer, (b) about 1 to about 15 parts of a 1,3-diaminopropane or salt thereof per hundred parts by weight of the halopolymer, (c) sulfur or a sulfur-containing compound, and (d) an acid acceptor.

2. A heat-curable composition according to claim 1 wherein the halopolymer is selected from the group consisting of chlorinated polyethylene, chlorosulfonated polyethylene, bromochlorinated polyethylene, and polychloroprene.

3. A heat-curable composition according to claim 1 wherein the halopolymer comprises chlorinated polyethylene having a chlorine content greater than about 25 percent.

4. A heat-curable composition according to claim 1 wherein the acid acceptor is selected from the group consisting of alkali metal or alkaline earth metal oxides, hydroxides, sulfides, carbonates, and phosphates.

5. A heat-curable composition according to claim 4 wherein the acid acceptor comprises calcium oxide, magnesium oxide, or calcium hydroxide.

6. A heat-curable composition according to claim 1 further comprising iodide ions in an amount such that the molar ratio of iodide ions to 1,3-diaminopropane or salt thereof is less than about 1:1.

7. A heat-curable composition according to claim 1 wherein the 1,3-diaminopropane comprises a 1,3-diaminopropane having single or multiple substitution of the carbon or nitrogen moieties with alkyl, alkenyl, cycloalkyl, or aryl groups.

8. A heat-curable composition according to claim 7 wherein the 1,3-diaminopropane comprises an N-alkyl-1,3-diaminopropane wherein the alkyl group contains from about 4 to about 20 carbon atoms.

9. A heat-curable composition according to claim 7 wherein the 1,3-diaminopropane comprises an N-aliphatic-1,3-diaminopropane wherein the aliphatic group is derived from tallow.

10. A heat-curable composition according to claim 1 wherein component (c) consists of about 0.1 to about 10 parts of elemental sulfur per 100 parts by weight of the halopolymer.

11. A heat-curable composition according to claim 1 wherein the amount of acid acceptor ranges from about 1 to about 20 parts per 100 parts by weight of the halopolymer.

12. In a process of heat-curing a chlorine- or bromine-containing halopolymer with an aliphatic polyamine vulcanizing agent, an acid acceptor, and sulfur or a sulfur-containing compound, the improvement characterized by employing a 1,3-diaminopropane or salt thereof as the aliphatic polyamine.

13. A process according to claim 12 wherein the halopolymer is selected from the group consisting of chlorinated polyethylene, chlorosulfonated polyethylene, bromochlorinated polyethylene, and polychloroprene.

14. A process according to claim 12 wherein the halopolymer comprises chlorinated polyethylene having a chlorine content greater than about 25 percent.

15. A process according to claim 12 wherein the 1,3-diaminopropane comprises a 1,3-diaminopropane having single or multiple substitution of the carbon or nitrogen moieties with alkyl, alkenyl, cycloalkyl, or aryl groups.

16. A process according to claim 15 wherein the 1,3-diaminopropane comprises an N-alkyl-1,3-diaminopropane wherein the alkyl group contains from about 4 to about 20 carbon atoms.

17. A process according to claim 15 wherein the 1,3-diaminopropane comprises an N-aliphatic-1,3-diaminopropane wherein the aliphatic group is derived from tallow.

* * * * *